(12) United States Patent
MacLennan et al.

(10) Patent No.: US 10,962,029 B2
(45) Date of Patent: Mar. 30, 2021

(54) RESERVOIR FOR A HYDRAULIC SYSTEM

(71) Applicant: Airbus Operations GmbH, Hamburg (DE)

(72) Inventors: Simon MacLennan, Hamburg (DE); Robert Behr, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 4 days.

(21) Appl. No.: 16/388,343

(22) Filed: Apr. 18, 2019

(65) Prior Publication Data
US 2019/0360504 A1 Nov. 28, 2019

(30) Foreign Application Priority Data
May 24, 2018 (DE) .......................... 102018112523.2

(51) Int. Cl.
*F15B 1/26* (2006.01)
*F15B 15/14* (2006.01)
*F16H 19/04* (2006.01)

(52) U.S. Cl.
CPC .............. *F15B 1/265* (2013.01); *F15B 15/14* (2013.01); *F16H 19/04* (2013.01)

(58) Field of Classification Search
CPC ........ F15B 15/14; F15B 15/06; F15B 15/065; F15B 15/265; F16H 19/04; F16H 19/0622; B65D 25/06
USPC ....... 137/565.12; 138/30; 220/529–531, 563, 220/581
See application file for complete search history.

(56) References Cited

U.S. PATENT DOCUMENTS 2,409,210 A * 10/1946 Jolly ........................ B64D 1/04
  89/1.815
2,893,434 A * 7/1959 Hyman ..................... F16K 7/06
  138/30

(Continued)

FOREIGN PATENT DOCUMENTS

DE 1126756 B 3/1962
DE 3738943 A1 6/1988

(Continued)

OTHER PUBLICATIONS

"Accessories Aren't Just Bells and Whistles", Motion System—Hydraulics & Pneumatics, Penton Media, Cleveland, OH, US, Bd. 60, Nr. 12, Dec. 1, 2007, Seiten ISSN: 1543-6470.

*Primary Examiner* — Angelisa L. Hicks
(74) *Attorney, Agent, or Firm* — Greer, Burns & Crain, Ltd.

(57) ABSTRACT

A reservoir for a hydraulic system has a housing with an interior space and a fluid outlet, a hydraulic driving device coupled to a shaft extending in the housing to introduce a torque, and a separating device in the housing, for dividing the interior space into two separate sections. The fluid outlet is fluidically connected to a first section. The separating device extends along the shaft in the housing and sets the size ratio of the two separate sections by pivoting at least one first surface, coupled to the shaft, of the separating device about an axis defined by the shaft. The separating device is coupled to the hydraulic driving device such that the at least one first surface exerts a pressure on a fluid in the first section which is dependent on a surface area of the first surface and the torque.

12 Claims, 2 Drawing Sheets

(56) References Cited

U.S. PATENT DOCUMENTS

| | | | | |
|---|---|---|---|---|
| 3,935,882 A * | 2/1976 | Matthews | ............... | F15B 1/103 |
| | | | | 138/30 |
| 9,810,245 B2 * | 11/2017 | Jaccoby | .................. | F15B 15/02 |
| 2011/0049400 A1 * | 3/2011 | ter Horst | ............... | F15B 15/227 |
| | | | | 251/25 |
| 2013/0206238 A1 * | 8/2013 | Gent | ....................... | F16K 1/224 |
| | | | | 137/1 |
| 2017/0314584 A1 * | 11/2017 | Holtgraver | .......... | F15B 15/1409 |

FOREIGN PATENT DOCUMENTS

| | | |
|---|---|---|
| DE | 202005017434 U1 | 1/2006 |
| DE | 102007037665 A1 | 2/2009 |
| FR | 1102637 A | 10/1955 |

\* cited by examiner

RESERVOIR FOR A HYDRAULIC SYSTEM

CROSS-REFERENCE TO PRIORITY APPLICATION

This application claims the benefit of, and priority to, German patent application number DE 102018112523.2, filed May 24, 2018. The content of the referenced application is incorporated by reference herein.

TECHNICAL FIELD

Embodiments of the subject matter described herein relate generally to a reservoir for a hydraulic system, to a hydraulic system that has at least one hydraulic reservoir of this kind, and to a vehicle having such a hydraulic system.

BACKGROUND

Hydraulic systems can generally have a predetermined volume of a hydraulic fluid and supply said fluid at a predetermined pressure. In this context, the reservoirs supplied can store a quantity of hydraulic fluid which is variable within predetermined limits. A variable filling level of the reservoir is worthwhile since the quantity of hydraulic fluid in consuming units can be similarly variable during operation.

Particularly in aircraft, "bootstrap reservoirs" have become established, and, in addition to the function of storing the hydraulic fluid, these can supply a slight excess pressure at a suction side, this being significantly below the pressure level of the hydraulic system. It is thereby possible to prevent cavitation in a hydraulic pump.

An established bootstrap reservoir has two pistons, which are connected mechanically to one another and have different surface areas. A smaller piston is subjected to a pressure supplied by the hydraulic system, with the result that it acts on the other, larger piston with a force dependent on the pressure and the area of the smaller piston. The larger piston, for its part, is connected to a low-pressure side and acts on the hydraulic fluid directed to the suction side of the pump. A certain pressure is thereby produced in the low-pressure side. The pressure of the hydraulic fluid at the low-pressure side and hence at the suction side of the pump can be determined in accordance with the ratio of the areas of the two pistons.

Such a construction is very efficient and effective but a certain overall length is required for this purpose.

BRIEF SUMMARY

It might be worthwhile to use a reservoir which, although able to provide the same functions as a bootstrap reservoir, is of more compact construction and, in particular, has a shorter overall length. No such design is known from the prior art.

Consequently, it is an object of the disclosure to supply an alternative hydraulic reservoir which has significantly smaller dimensions and, in particular, a shorter overall length.

The object is achieved by means of the features of independent claim 1. Advantageous embodiments and developments can be found in the dependent claims and the following description.

The proposal is for a reservoir for a hydraulic system, having a housing with an interior space and a fluid outlet, a hydraulic driving device, which is coupled to a shaft extending in the housing in order to introduce a torque, and a separating device, arranged in the housing, for dividing the interior space into two separate sections, wherein the fluid outlet is fluidically connected to a first section, wherein the separating device extends along the shaft in the housing, wherein the separating device is designed to set the size ratio of the two separate sections by pivoting at least one first surface, coupled to the shaft, of the separating device about an axis defined by the shaft, and wherein the separating device is coupled to the hydraulic driving device in such a way that the at least one first surface exerts a pressure on a fluid in the first section which is dependent on a surface area of the first surface and the torque.

The fundamental construction of the reservoir according to the disclosure thus differs significantly from a conventional bootstrap construction. A core aspect relates to the combination of the hydraulic driving device and the first surface, coupled to the shaft, of the above mentioned separating device. As explained in detail below, it is thereby possible to achieve the same advantages as with a bootstrap reservoir but with significantly more compact dimensions.

The housing serves to hold the fluid, in particular a hydraulic fluid. The interior space defined in the housing can preferably but not necessarily be cylindrical. In particular, the housing can have a longitudinal axis or central axis which defines a direction of extent of the housing.

The interior space of the housing is divided by the separating device into two separate sections. In this context, a section should be taken to mean a part of the interior space which is separate from another part or section of the interior space. It would be possible, for instance, for the first surface to extend radially outwards from the shaft and to completely bridge an interspace between the shaft and an inner wall of the housing. A fixed second surface, which completes the separation of the interior space by a radial extent, could be arranged on another side of the shaft. The sizes of the two separate sections are determined in accordance with the pivoting angle of the first surface around the shaft or longitudinal axis or the central axis.

One of the sections is fluidically connected to the fluid outlet. The fluid outlet is provided for the purpose of supplying a hydraulic pump with fluid. If fluid is taken from the first section, the first surface can pivot further around the longitudinal axis or central axis owing to a torque applied via the shaft. By means of the pivoting, the volume of the first section can be successively reduced, thus compensating the volume loss of the fluid, while a force or pressure acts on the remaining fluid. Consequently, there is always a fluid at a certain pressure at the fluid outlet that can be fed to a pump.

If, on the other hand, fluid is reintroduced into the first section through a fluid inlet not specified in detail here, the first surface can be pivoted in the other direction, enlarging the volume of the first section again. The instantaneous angle of the first surface is established by the equilibrium of forces between the force acting on the first surface due to the fluid and the torque on the shaft.

The hydraulic driving device is designed to introduce a certain torque into the shaft to ensure that the desired pressure is available at the fluid outlet. It is possible to use different variants that can produce a torque from a hydraulic pressure, e.g. from a high-pressure side of a hydraulic system. Owing to the limited pivoting angle of the first surface, it might be worthwhile to provide a piston with a limited actuating path which is used to produce torque by means of a lever construction or the like. In this variant, however, the actuating path of the piston would have to be not along the central axis or longitudinal axis, i.e. the extent of the shaft, but transversely thereto. One consequence of this is a significant reduction in the required overall length of the reservoir as compared with a conventional bootstrap reservoir. Moreover, a flat, more compact construction can be achieved through the use of a surface element which can be pivoted around a shaft.

Overall, improved compactness and a significantly shorter overall length is achieved by means of the reservoir, while functioning remains the same and adaptability to a desired pressure likewise remains the same.

In an advantageous embodiment, the interior space is cylindrical. A particularly simple design of the housing is thereby obtained. The shaft can extend along a central axis of the interior space. In this case, the first surface can be embodied substantially as a rectangle and can completely cover one half of the cylindrical interior space. The first surface extends approximately from a bottom surface of the interior space to an oppositely arranged top surface and between the shaft and an inner wall situated radially on the outside.

It is therefore preferred if the first surface extends radially outwards from the shaft to an inner wall of the interior space. In order to achieve complete sealing between the shaft and the inner wall, a first sliding seal can be arranged on the first surface. This could be supported on the inner wall and could be designed in such a way that fluid is prevented from flowing out of the first section into the second section past the first surface.

In a likewise preferred embodiment, the separating device furthermore has a second surface, which is arranged rigidly in the interior space and extends radially with respect to the shaft from an inner wall of the interior space. Here too, it is worthwhile to arrange a second sliding seal on the second surface, which is supported on the shaft. This should prevent fluid passing from the first section to the second section around the second surface. The arrangement comprising the first surface and the second surface thus provides the possibility of implementing both the first section and the second section as cylinder segments. This can provide a kind of wedge-shaped volume with a circular segment as a base surface, wherein the two sections add up substantially to 360° and the division between the two sections is determined solely by the angle between the first surface and the second surface.

In an advantageous embodiment, the hydraulic driving device has a piston which is mounted movably in a cylinder, is coupled mechanically to an input shaft and can be subjected to a hydraulic pressure via a high-pressure inlet in the cylinder. Consequently, the piston can be subjected to a hydraulic pressure available at the high-pressure inlet, with the result that a force acts on the piston in order to move the latter in the cylinder, where applicable. The high pressure can come from a hydraulic system which contains the reservoir. Mechanical coupling to the input shaft enables the piston to introduce a torque into the input shaft due to the force generated. It is self-evident that the input shaft is coupled to this in order to introduce a torque into the shaft. This could be accomplished by an appropriate coupling. In this variant, the hydraulic driving device and the housing can be provided separately from one another as respective independent units.

In a preferred embodiment, the piston is connected to a rack having a first tooth system, wherein the input shaft is provided with a second tooth system and wherein the first tooth system engages in the second tooth system. A force acting on the piston can therefore be introduced into the input shaft directly at a circumference of the latter. The lever arm via which the force acting on the piston acts on the input shaft is determined by the effective diameter of the second tooth system. Consequently, the torque applied to the input shaft can be determined in accordance with the size of the surface of the piston and the level of the pressure at the high-pressure inlet. As already mentioned above, the pressure in the first section can thereby be determined since the surface area of the first surface is taken into account.

The reservoir according to the disclosure therefore enables the pressure in the first section to be influenced at several locations. Thus, particularly good adjustability and modularity of the reservoir is made possible. The reservoir can be adapted to different pressure levels of a hydraulic system by varying one or more components without always generating a different pressure in the first section. The pressure in the first section can be increased by enlarging the piston area. An increase in this pressure is also associated with enlarging the effective diameter of the second tooth system. The pressure is furthermore influenced by variation of the surface area and radial extent of the first surface. These three components can be selected and combined independently of one another. It could be worthwhile, for the sake of achieving particular modularity, to supply different housing sizes with different configurations of the first surface and to supply different hydraulic driving devices with different piston sizes.

As an alternative to a rack, a lever mechanism comprising interconnected levers connected to the pistons and the input shaft could also be implemented, particularly owing to the limited pivoting travel. It would thereby be possible to achieve a pivoting movement of approximately 180° by the first surface.

In an advantageous embodiment, the housing is provided with an aperture which is fluidically connected to the second section. It is thereby possible to compensate a variable gas volume in the second section during the movement of the first surface. Gas can enter the second section through the aperture or flow out again via said aperture. To prevent any possible contamination, the aperture can be provided with a filter or the like. It is possible, in particular, for the gas to be air.

In an advantageous embodiment of the invention, the hydraulic driving device and the first surface are embodied in such a way that a pressure ratio between a pressure at the hydraulic driving device and the fluid outlet in a range of from 1:25 to 1:120 is set.

The disclosure furthermore relates to a hydraulic system having at least one hydraulic reservoir according to the above description.

In a preferred embodiment, the hydraulic system has a pump, which has an inlet and an outlet, wherein the inlet is coupled to the fluid outlet of the hydraulic reservoir and wherein the outlet is coupled to the hydraulic driving device.

The disclosure furthermore relates to a vehicle having a hydraulic system according to the above description.

In one variant, the vehicle is an aircraft. It could be worthwhile here to make the level of the pressure in the first section dependent on the installation position of the hydraulic reservoir in relation to the installation position of the pump. Moreover, matching of the hydraulic driving device and of the surface area of the first surface should be made dependent on the pressure envisaged for the hydraulic system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the presented subject matter will be found in the following description of the embodiment examples and the figures. Here, all the features described and/or depicted, in themselves and in any desired combination, form the subject matter of the disclosure, even when considered independently of their combination in the individual claims or the dependency references thereof. In the figures, the same reference signs furthermore stand for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
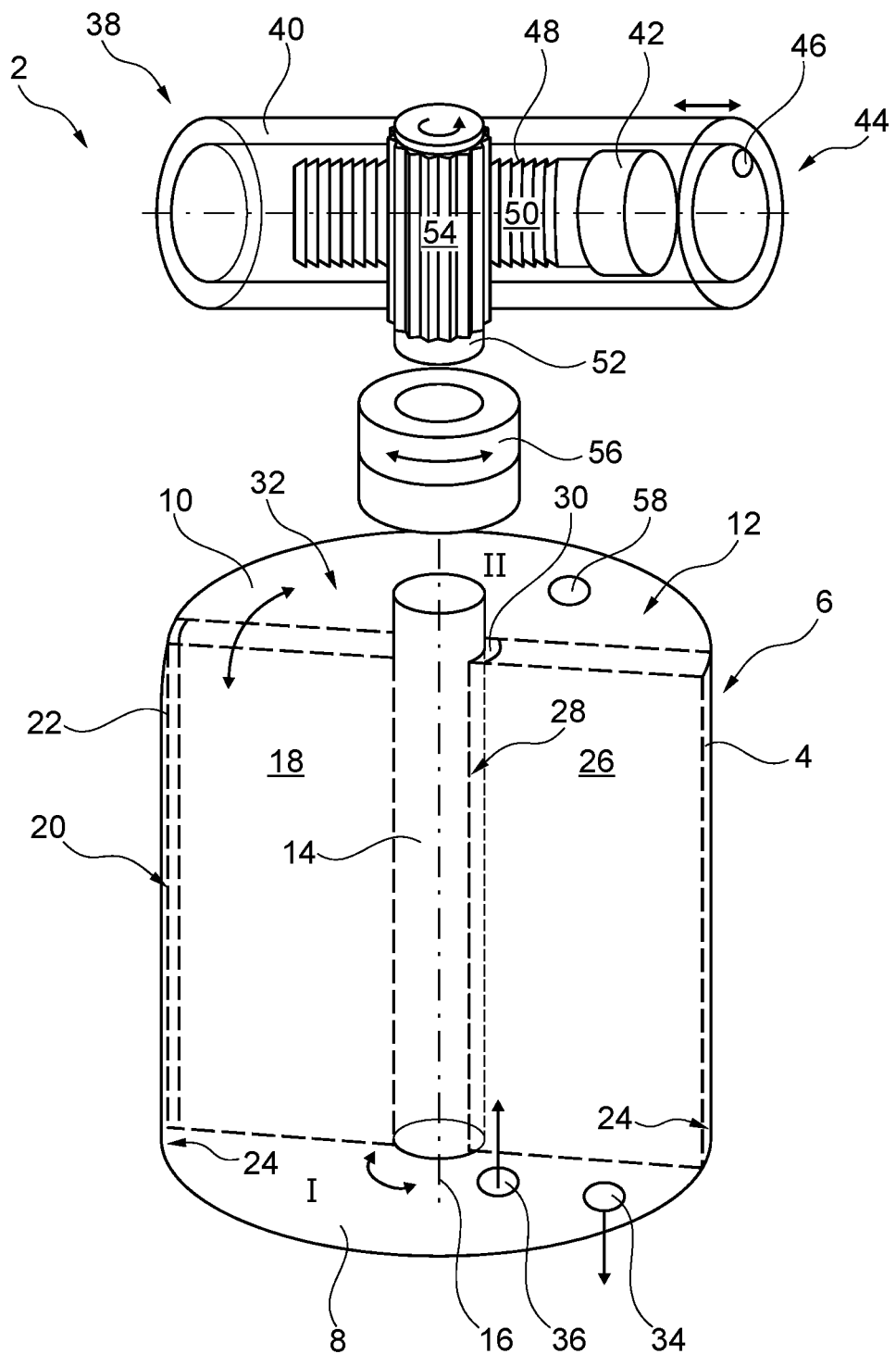
FIG. 1 shows a schematic illustration of a reservoir according to an embodiment of the invention.

FIG. 1 shows a schematic illustration of a hydraulic reservoir 2 according to an embodiment of the invention. The reservoir 2 has a housing 4, which is of cylindrical design by way of example. For this purpose, the housing 4 has a lateral surface 6, which is supplemented by a bottom 8 and a top 10. The housing 4 forms an interior space 12, through which a shaft 14 extends. This shaft is arranged along a central axis 16, extends substantially completely through the entire interior space 12 and projects outwards from the top 10.

The shaft 14 is preferably sealed off in the top 10, e.g. by means of a radial shaft sealing ring (not shown) or a similar device. The shaft 14 is rotatably mounted in the housing 4 and connected to a first surface 18. By way of example, this is of rectangular design and extends from the bottom 8 to the top 10 in the interior space 12. Because it is attached to the shaft 14, it follows the movement of the latter. At a radially outer end 20 of the first surface 18 there is a first sliding seal 22, which seals off the first surface 18 with respect to an inner wall 24.

A second surface 26, which is likewise of rectangular design by way of example, is illustrated on an opposite side of the shaft 14 in this illustration. The second surface 26 is connected rigidly to the inner wall 24 and extends radially to the shaft 14. On an edge 28 of the second surface 26 facing the shaft 14 there is a second sliding seal 30, which can be of similar construction to the first sliding seal 22 and seals off the shaft 14 with respect to the second surface 26. The shaft 14, the first surface 18 and the second surface 26 form a separating device 32, which divides the interior space 12 into a first section I and a second section II.

With this construction, the first surface 18 can thus be pivoted around the central axis 16 by rotation of the shaft 14, enlarging the first section I and reducing the second section II or vice versa.

Arranged in the first section I is a fluid outlet 34, which is fluidically connected to the first section I. A fluid inlet 36, which is likewise fluidically connected to the first section I, is furthermore provided. Fluid can be taken from the first section I via the fluid outlet 34 by a hydraulic pump or the like, and fluid can be introduced back into the first section I from the fluid inlet 36.

In addition, a hydraulic driving device 38 is provided and has a cylinder 40, in which a piston 42 is movably mounted. At a first end 44, the cylinder 40 has a high-pressure inlet 46, which can be coupled to a high-pressure line of a hydraulic system. The piston 42 is thereby subjected to a high pressure of the hydraulic system and experiences a force directed away from the first end 44.

A rack 48, which is provided with a first tooth system 50, is arranged on a side of the piston 42 facing away from the first end 44. The hydraulic driving device 38 furthermore has an input shaft 52, which is provided with a second tooth system 54. The input shaft 52 is mounted rotatably in the hydraulic driving device 38 in such a way that the first tooth system 50 and the second tooth system 54 engage in one another. Thus, if the piston 42 is subjected to a pressure, a torque is introduced into the input shaft 52 via the tooth systems 50 and 54.

The input shaft 52 is connected to the shaft 14 via a coupling 56. Consequently, the torque introduced into the input shaft 52 is transmitted into the shaft 14 via the coupling 56. If there is a hydraulic fluid in the first section I, pressurization of the hydraulic fluid is consequently achieved by means of the first surface 18, with the result that said fluid is available at the fluid outlet 34 at a certain excess pressure. This excess pressure is determined by the size of the surface of the piston 42, an effective diameter of the second tooth system 54, a size of the first surface 18 and the radial extent thereof from the central axis 16 and by the pressure applied at the high-pressure inlet 46. With a given pressure level of a hydraulic system, it is thus possible to achieve a desired low pressure level at the fluid outlet 34 by adapting the piston 42, the input shaft 52 and the first surface 18.

When fluid is removed from the first section I, the first surface 18 can furthermore follow the falling fluid volume in the first section I or, as the fluid volume in section I increases, can give way to inflowing fluid from the fluid inlet 36. The possible pivoting movement of the first surface 18 is determined by the length of the first tooth system 50.

It is possible, in particular, for there to be air in section II, and this is likewise subject to a variable volume of the second section II. To compensate for this variable volume, an aperture 58 is provided, which is fluidically connected to the second section II and, by way of example, is arranged in the top 10. As a result, air can escape from the second section II or enter via said section without problems.

Figure 2:
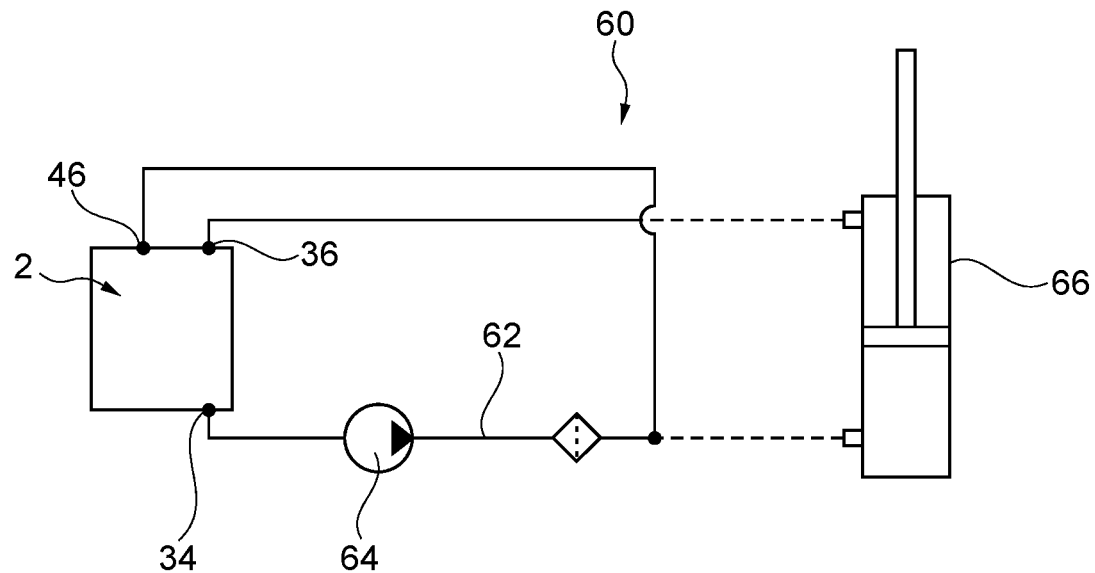
FIG. 2 shows schematically a hydraulic system having a reservoir of this kind.

FIG. 2 shows, by way of example, a schematic hydraulic system 60, which is equipped with hydraulic lines 62, a pump 64, a consuming unit 66 and a hydraulic reservoir 2. Here, by way of example, the high-pressure inlet 46 is coupled to one of the lines 62, with the result that a pressure brought about by the pump 64 leads to generation of pressure at the fluid outlet 34.

Figure 3:
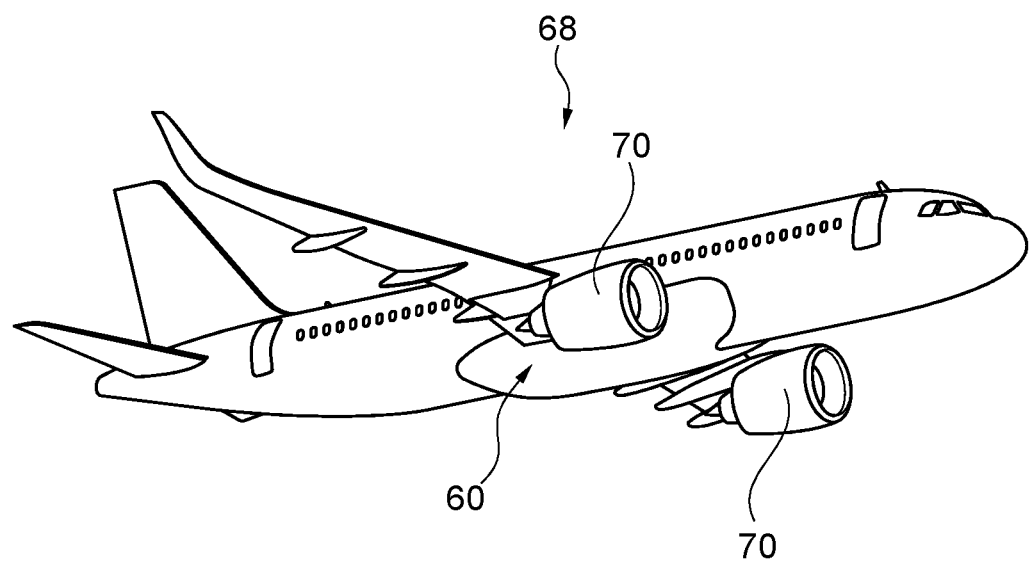
FIG. 3 shows an aircraft into which a hydraulic system of this kind is integrated.

Finally, FIG. 3 shows an aircraft 68 fitted with a hydraulic system 60 of this kind. The pump 64 could be arranged in or on an engine 70, for example.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A reservoir for a hydraulic system, the reservoir comprising:
   a housing with an interior space and a fluid outlet;
   a hydraulic driving device coupled to a shaft extending in the housing to introduce a torque; and
   a separating device, arranged in the housing to divide the interior space into a first section and a second section that is separate from the first section, wherein the fluid outlet is fluidically connected to the first section;
   wherein the separating device comprises at least one first surface which is movable relative to the housing and a second surface which is immobile relative to the housing;
   wherein the separating device extends along the shaft in the housing;
   wherein the separating device is configured to change a size ratio of the first and second sections by pivoting the at least one first surface, coupled to the shaft, of the separating device about an axis defined by a longitudinal axis of the shaft and relative to the second surface; and
   wherein the separating device is coupled to the hydraulic driving device such that the at least one first surface exerts a pressure on a fluid in the first section which is dependent on a surface area of the first surface and the torque.

2. The reservoir according to claim 1, wherein the interior space is cylindrical.

3. The reservoir according to claim 1, wherein the first surface extends radially outwards from the shaft to an inner wall of the interior space.

4. The reservoir according to claim 1, the separating device further comprising the second surface extending radially with respect to the shaft from an inner wall of the interior space.

5. The reservoir according to claim 1, wherein the hydraulic driving device has a piston mounted movably in a cylinder and coupled mechanically to an input shaft, the piston being subjected to a hydraulic pressure via a high-pressure inlet in the cylinder.

6. The reservoir according to claim 5, wherein the piston is connected to a rack having a first tooth system, wherein the input shaft comprises a second tooth system, and wherein the first tooth system engages in the second tooth system.

7. The reservoir according to claim 1, wherein the housing has an aperture which is fluidically connected to the second section.

8. The reservoir according to claim 1, wherein the hydraulic driving device and the first surface are configured to set a pressure ratio, between a pressure at the hydraulic driving device and the fluid outlet, in a range between 1:25 and 1:120.

9. A hydraulic system comprising at least one reservoir according to claim 1.

10. The hydraulic system according to claim 9, wherein the hydraulic system comprises a pump having an inlet and an outlet, wherein the inlet is coupled to the fluid outlet of the reservoir and wherein the outlet is coupled to the hydraulic driving device.

11. A vehicle comprising a hydraulic system according to claim 9.

12. The vehicle according to claim 11, wherein the vehicle is an aircraft.

* * * * *